(12) United States Patent
Ye et al.

(10) Patent No.: US 7,885,638 B2
(45) Date of Patent: Feb. 8, 2011

(54) IMPLEMENTING GENERIC CELL GLOBAL IDENTITY FOR UNLICENSED MOBILE ACCESS

(75) Inventors: William Ye, Plano, TX (US); Rasik Kachhla, Plano, TX (US); Bruno Landais, Pleumeur Bodou (FR)

(73) Assignee: Alcatel Lucent, Paris (FR)

( * ) Notice: Subject to any disclaimer, the term of this patent is extended or adjusted under 35 U.S.C. 154(b) by 732 days.

(21) Appl. No.: 11/982,687

(22) Filed: Nov. 2, 2007

(65) Prior Publication Data

US 2009/0117874 A1    May 7, 2009

(51) Int. Cl.
*H04M 11/00* (2006.01)
(52) U.S. Cl. .................. 455/406; 455/407; 455/408
(58) Field of Classification Search .................. 455/406, 455/407, 408
See application file for complete search history.

(56) References Cited

U.S. PATENT DOCUMENTS

2002/0068545 A1* 6/2002 Oyama et al. ............... 455/406
2010/0048165 A1* 2/2010 Caldwell et al. ............ 455/406

FOREIGN PATENT DOCUMENTS

WO   WO 2007/047292 A    4/2007
WO   WO 2007/096685 A    8/2007

\* cited by examiner

*Primary Examiner*—Barry W Taylor
(74) *Attorney, Agent, or Firm*—Galasso & Associates, L.P.

(57) ABSTRACT

A method for causing GSM location information and UMA billing information to be encapsulated in a single CGI structural element during a standalone UMA network access session comprises a plurality of operations. An operation is provided for applying at least one algorithm to location information of a Mobile Station (MS) serving a subscriber device during a standalone UMA network access session for causing at least one of compressing, re-aligning and repackaging the MS location information whereby an amount of MS location information holding space of a GSM Edge Radio Access Network (GERAN) Cell Global Identity (CGI) structural element occupied by the MS location information is reduced such that a portion of the MS location information holding space becomes unused. An operation is performed for inserting UMA billing information into at least a portion of the unused portion of the MS location information holding space.

22 Claims, 2 Drawing Sheets

IMPLEMENTING GENERIC CELL GLOBAL IDENTITY FOR UNLICENSED MOBILE ACCESS

FIELD OF THE DISCLOSURE

The disclosures made herein relate generally to wireless telecommunications methodologies and systems and, more particularly, to implementing generic cell global identity for unlicensed mobile access.

BACKGROUND

Unlicensed Mobile Access (UMA) technology provides access to Global System for Mobile Communication (GSM) and General Packet Radio Service (GPRS) services over unlicensed spectrum technologies. Examples of such unlicensed spectrum technologies include, but are not limited to, Bluetooth wireless solutions and wireless fidelity (WiFi) wireless solutions. By deploying UMA technology, service providers allow wireless subscribers to roam and handover between cellular networks and unlicensed cellular networks using dual-mode mobile GSM/GPRS and UMA-enabled handsets, PDAs and the like. As such, UMA technology provides for wireless subscribers to engage in UMA network access sessions.

Billing options give a service provider flexibility to charge UMA usage in different patterns. By using Cell Global Identity (CGI) based billing solution, these patterns are reflected in UMA CGI and passed to a Mobile Services Switching Center (MSC) so that a billing system at the MSC will be able to apply the appropriate billing option for each usage pattern.

Standalone UMA network architecture, which is currently offered by Alcatel-Lucent, allows UMA functionality to be cost-effectively integrated into legacy core networks. In a standalone UMA network access session, UMA CGI needs to encapsulate both GSM location information as well as UMA billing information. However, for such a standalone UMA network implementation, there is no known solution for allowing UMA CGI to encapsulate both GSM location information and UMA billing information. Although it is known that two associated CGIs (i.e., UMA Registration CGI and UMA Billing CGI) can be used for encapsulating both GSM location information and UMA billing information in next generation networks (NGNs), such a solution does not work with standalone UMA network architecture. For example, implementation of such a two-CGI solution can result in calls being rejected by a MSC handling such calls.

Therefore, a solution for allowing both GSM location information and UMA billing information to be encapsulated during a standalone UMA network access session would be advantageous, desirable, and useful.

SUMMARY OF THE DISCLOSURE

Embodiments of the present invention allow both GSM location information and UMA billing information to be encapsulated during a standalone UMA network access session. More specifically, embodiments of the present invention provide for a one-CGI based UMA (i.e., UMA Generic CGI) in which there is a single UMA CGI having GSM location information and UMA billing information encapsulated therein. Such a single UMA CGI is used in UMA network access session processes such as, for example, Registration procedure, Location Update procedure and normal UMA calls. To this end, a single UMA CGI in accordance with the present invention is constructed by using a GSM Edge Radio Access Network (GERAN) CGI as the base and adding extra information relating to UMA billing information.

The objectives for a single UMA CGI in accordance with the present invention include providing alternative to existing two CGI approach (UMA Registration CGI and UMA Billing CGI) by using only one UMA CGI, being flexible enough to adapt to individual customer needs and specific network situations, and minimizing the impact for existing MSC and maintenance overhead involved. Furthermore, a single UMA CGI in accordance with the present invention is advantageous in that it preserves GERAN mobile location information, contains UMA billing option to facilitate billing in core networks, provides an uniform and consistent way to construct/use/share UMA CGI in all UMA network nodes (including the Mobile Station) Captures billing information and GSM location information in one CGI, reduces location updates thereby saving valuable bandwidth of MSC and HLR, allows law enforcement agencies and emergency centers track down on the MS, and supports billing system by providing a UMA billing category.

In one embodiment of the present invention, a method for causing GSM location information and UMA billing information to be encapsulated in a single CGI structural element during a standalone UMA network access session comprises a plurality of operations. An operation is performed for providing a GERAN CGI structural element containing location information of a MS serving a subscriber device during a standalone UMA network access session. An operation is performed for manipulating the MS location information for reducing an amount of MS location information holding space of the GERAN CGI structural element occupied by the MS location information such that a portion of the MS location information holding space becomes unused. An operation is performed for occupying at least a portion of the unused portion of the MS location information holding space with UMA billing information.

In another embodiment of the present invention, a method for causing GSM location information and UMA billing information to be encapsulated in a single CGI structural element during a standalone UMA network access session comprises a plurality of operations. An operation is provided for applying at least one algorithm to location information of a MS serving a subscriber device during a standalone UMA network access session for causing at least one of compressing, re-aligning and repackaging the MS location information whereby an amount of MS location information holding space of a GERAN CGI structural element occupied by the MS location information is reduced such that a portion of the MS location information holding space becomes unused. An operation is performed for inserting UMA billing information into at least a portion of the unused portion of the MS location information holding space.

In still another embodiment of the present invention, a server or gateway is capable of causing GSM location information and UMA billing information to be encapsulated in a single CGI structural element during a standalone UMA network access session. The server or gateway is configured for: (i) providing a GERAN CGI structural element containing location information of a Mobile Station (MS) serving a subscriber device during a standalone UMA network access session, (ii) manipulating the MS location information for reducing an amount of MS location information holding space of the GERAN CGI structural element occupied by the MS location information such that a portion of the MS location information holding space becomes unused, and (iii)

occupying at least a portion of the unused portion of the MS location information holding space with UMA billing information.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
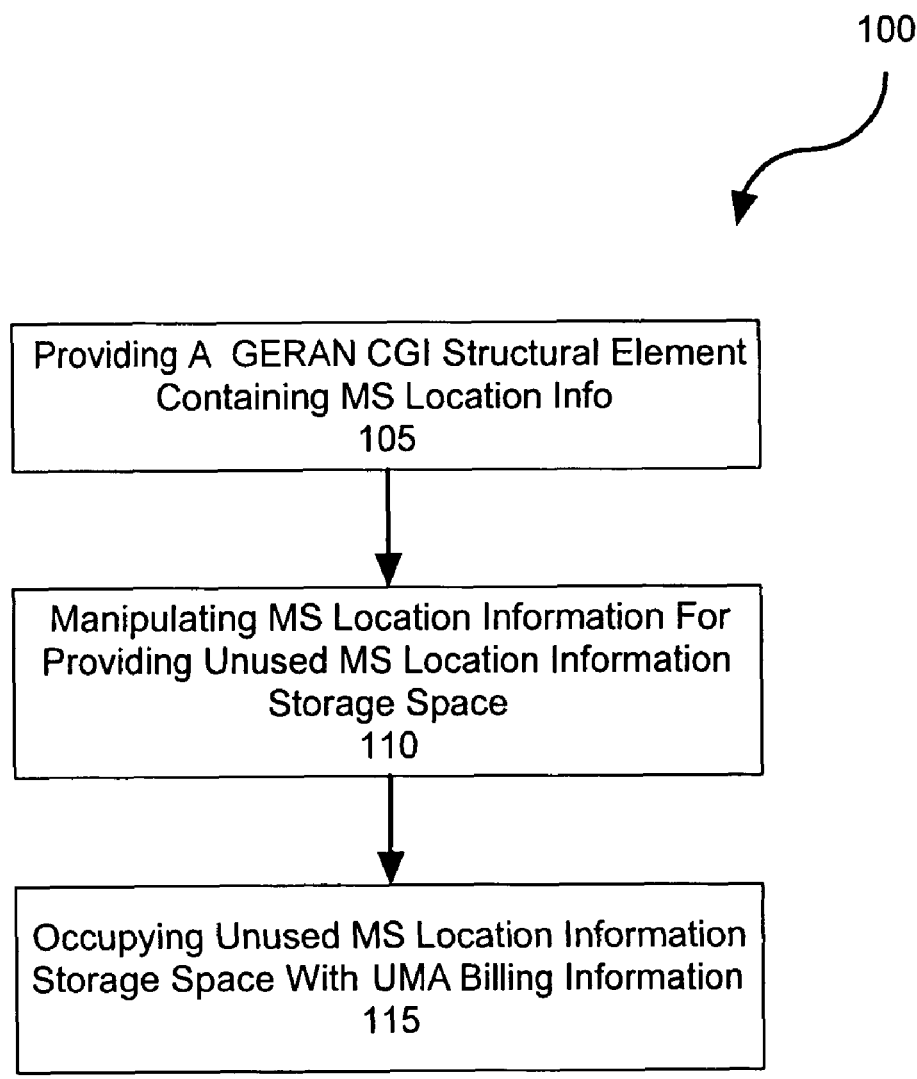
FIG. 1 shows a method in accordance with an embodiment of the present invention, which causes GSM location information and UMA billing information to be encapsulated in a single CGI structural element during a standalone UMA network access session

FIG. 1 shown a method 100 in accordance with an embodiment of the present invention. The method 100 causes GSM location information and UMA billing information to be encapsulated in a single CGI structural element during a standalone UMA network access session (i.e., also referred to herein as standalone UMA CGI functionality or as generic CGI). The method 100 accomplishes such encapsulation using a GERAN CGI as the base CGI structural element and adding extra information relating to UMA billing information to the GERAN CGI.

The method 100 includes an operation 105 for providing a GERAN CGI structural element containing location information of a MS serving a subscriber device during a standalone UMA network access session. The MS location information includes Location Area Identification (LAI) information and Cell Identity (CID) information. In response to the GERAN CGI structural element being provided, an operation 110 is performed for manipulating the MS location information for reducing an amount of MS location information holding space of the GERAN CGI structural element occupied by the MS location information such that a portion of the MS location information holding space becomes unused. In one embodiment, the operation of manipulating the MS location information preferably includes applying at least one network-specific algorithm to the MS location information for causing the MS location information to the compressed, re-aligned and/or repackaged. After such manipulation is performed, an operation 115 is performed for occupying at least a portion of the unused portion of the MS location information holding space with UMA billing information. In one embodiment, the operation of occupying the unused portion of the holding space with UMA billing information preferably includes inserting the UMA billing information into at least a portion of the unused portion of the MS location information holding space.

Thus, in view of the disclosure of the method 100, a skilled person will appreciate that a method for causing GSM location information and UMA billing information to be encapsulated in a single CGI structural element during a standalone UMA network access session can include an operation for applying at least one algorithm to location information of a Mobile Station (MS) serving a subscriber device during a standalone UMA network access session for causing at least one of compressing, re-aligning and repackaging the MS location information whereby an amount of MS location information holding space of a GSM Edge Radio Access Network (GERAN) Cell Global Identity (CGI) structural element occupied by the MS location information is reduced such that a portion of the MS location information holding space becomes unused, and an operation for inserting UMA billing information into at least a portion of the unused portion of the MS location information holding space.

Furthermore, in view of the disclosures made herein, a skilled person will appreciate that a server or gateway can be configured for carrying out a method in accordance with an embodiment of the present invention. As such, such a server or gateway configured in accordance with the present invention will be capable of causing GSM location information and UMA billing information to be encapsulated in a single CGI structural element during a standalone UMA network access session.

In order for single UMA CGI in accordance with the present invention to properly function in a network, various network entities can require certain modification from a conventional or standard structure. Many of these modifications are configuration changes such that no implementation logic will be affected. With respect to the MSC (Mobile Services Switching Center), for example, it may be necessary to configure UMA handover CGI and to configure emergency call routing for UMA CGI. With respect to the GGW (GPRS Gateway), for example, it may be necessary to configure each LUPS (Logical UNC Packet Switch) with a correct UMA RAI (Routing Area Identification). With respect to the UMA databases, for example, it may be necessary to configure correct database table/table entries to support UMA billing options. With respect to functionality required by LEAs (Law Enforcement Agencies), for example, it may be necessary to add capability to retrieve GSM CGI from UMA CGI. With respect to the backend office billing systems, for example, it may be necessary to add capability to retrieve billing options from UMA CGI.

Figure 2:
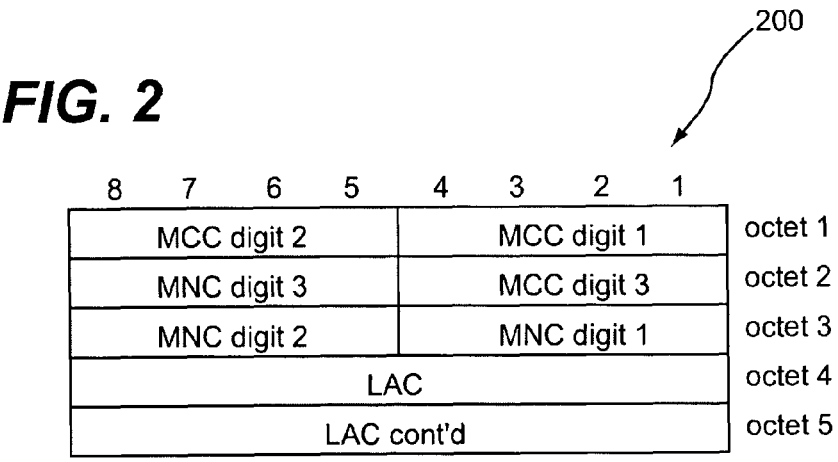
FIG. 2 shows a GERAN Location Area Identity (LAI) in accordance with the 3GPP TS 24.008 (i.e., $3^{rd}$ Generation Partnership Project Technical Specification 24.008)
Figure 3:
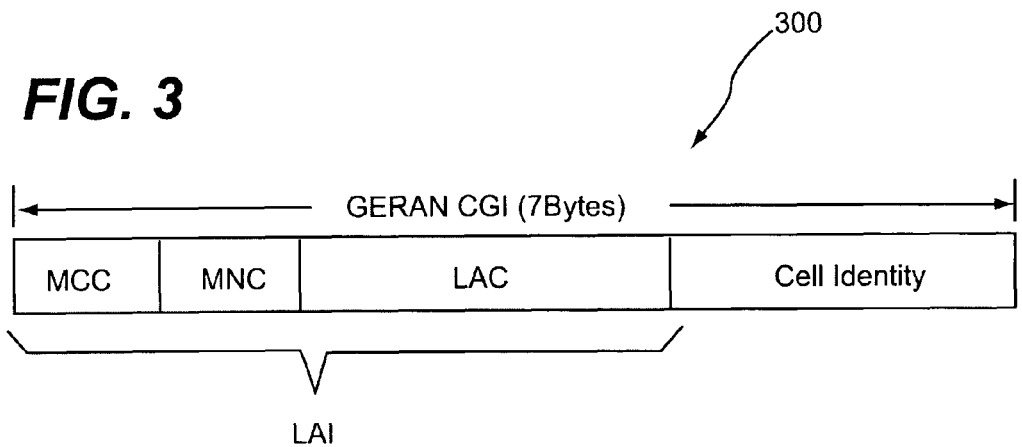
FIG. 3 shows a GERAN CGI structural element corresponding to the GERAN Location Area Identity (LAI) of FIG. 2.
Figure 4:
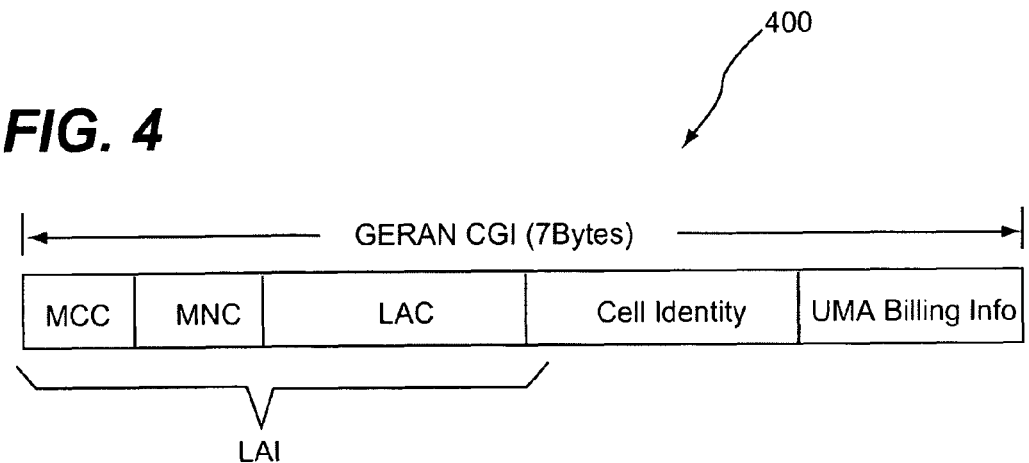
FIG. 4 shows a single UMA CGI structural element in accordance with an embodiment of the present invention.

Referring now to FIG. 2, a GERAN Location Area Identity (LAI) 200 in accordance with the 3GPP TS 24.008 (i.e., $3^{rd}$ Generation Partnership Project Technical Specification 24.008) is shown. The Location Area Identity (LAI) 200 includes MCC (Mobile Country Code) content, MNC (Mobile Network Code) content, and LAC (Location Area Code) content. As shown in FIG. 3, a GERAN CGI structural element 300 is the concatenation of the LAI 200 (i.e., the MCC, MNC, and LAC content thereof) and the Cell Identity (CID). Referring to FIG. 4, a single UMA CGI structural element 400 in accordance with an embodiment of the present invention is shown. The UMA CGI structural element 400 is the CGI that, during a standalone UMA network access session, is returned to a corresponding mobile device returned in the URR Registration Accept message, sent to MSC during location update, and sent to MSC in a Complete Layer 3 message. The single UMA CGI 400 is based on the GERAN CGI structural element, 300 but with UMA billing information encapsulated therein. To add the UMA billing information to the GERAN CGI structural element 300, one or more algorithms to compress or re-align/re-package GERAN MS location information (i.e., the LAI content) for created unused bits or bytes within the GERAN CGI structural element. UMA billing information is then inserted into these unused into these bits or bytes. In one embodiment, the one or more algorithms are tailored to customer-specific network configurations. Typically, a GERAN CGI structural element includes 7 bytes: 3 bytes for MCC/MNC, 2 for LAC, and 2 for CID. As can be seen in FIGS. 3 and 4, byte-wise, the GERAN CGI structural element 300 and the single UMA CGI 400 are the same size.

With regard to generating UMA billing information, at registration time for a UMA session, an Unlicensed Network Controller (UNC) will assess information relating to billing for each mobile subscriber (MS). Examples of such assessed information include, but are not limited to, International Mobile Subscriber Identity (IMSI) information, GSM CGI information, Access Point (AP) information, UMA subscriber profile information, etc. In one specific instance of assess such information, UNC verifies the information provided by a MS against provisioned data in various UMA databases after which a billing option is derived and is ready for use by UNC-CS in main CGI construction phase. Each time a new billing option is defined, new UMA database tables may be needed and new processing logic in UNC is likely needed. Examples of such UMA databases include, but are not limited to, a UMA Access Point database, a UMA CGI database, a UMA Subscriber database, a UMA Zone database, a UMA Service Type database, and the like. To this end, in implementing standalone UMA CGI functionality in accordance with the present invention, an administrator entity will work with service providers to define various UMA billing options for different usage patterns. After which, UMA databases will be appropriately provisioned and proper processing logic for billing options will be added to UNC.

Presented now are examples of algorithm structures configured for allowing UMA billing information to occupy all or some of an unused portion of MS location information holding space of a GERAN CGI. In view of these examples and the disclosures made herein, as skilled person may contemplate other algorithm structures suitably configured for allowing UMA billing information to occupy all or some of an unused portion of MS location information holding space of a GERAN CGI.

Example 1

In this example, UMA CGI construction uses finite number of UMA LACs per logical UNC for billing purposes and uses UMA CID to encapsulate location information in GSM CGI. Specific aspects of algorithms providing for such UMA CGI construction include:
1. During UMA Registration time, UNC-CS acquires UMA billing option (from UMA DB procedures) and GSM CGI (if available).
2. UNC-CS performs the following:
    a. If GSM LAI is available and is in UNC_AUTHORIZED_LAI_LIST (implies MCC/MNC option 1),
        i. use GSM MCC/MNC as UMA MCC/MNC, record NODEID (logical UNC) for the entry;
        ii. use CGI_OPTION_NUMBER 0, NODEID in previous step and UMA billing option to search UNC_ONE_CGI_UMA_LAC table, use the resulting UMA LAC;
        iii. if GsmCgiLacUsageMask is 0 (GSM CID is flat), use GSM CID as UMA CID;
        iv. else if sum of used bits in GsmCgiLacUsageMask (assume n) and GsmCgiCidUsageMask (assume m)<=16 (don't need mapping table), construct UMA CID as follows: put the n meaningful bits of GSM LAC in n MSBs of UMA CID and put the m meaningful bits of GSM CID in next m MSBs of UMA CID;
        v. else if sum of used bits in GsmCgiLacUsageMask and GsmCgiCidUsageMask>16 (need mapping table), find UMA CID by looking up UNC_ONE_CGI_UMA_CID_MAPPING table using CGI_OPTION_NUMBER 0, GSM MCC/MNC, GSM LAC and GSM CID;
        vi. search UNC_ONE_CGI_RAC_MAPPING table using GSM LAI and GSM RAC (if available) and obtain UMA RAC (Routing Area Code); and
        vii. use UMA LAI and UMA RAC to find LUPS
    b. Else if GSM LAI is available but not in UNC_AUTHORIZED_LAI_LIST (and UmaOneCgiMccMncOption indicates option 2), location information in GSM MCC/MNC needs to be preserved:
        i. randomly select NODEID (logical UNC), then find default UMA LAI for this logical UNC in UNC_AUTHORIZED_LAI_LIST, use UMA MCC and MNC from this default UMA LAI;
        ii. use CGI_OPTION_NUMBER 0, the NODEID number in previous step and UMA billing option to search UNC_ONE_CGI_UMA_LAC table, use the resulting UMA LAC;
        iii. search UNC_ONE_CGI_RAC_MAPPING table using the GSM LAI and GSM RAC (if available) and obtain UMA RAC;
        iv. find UMA CID by looking up UNC_ONE_CGI_UMA_CID_MAPPING table using CGI_OPTION_NUMBER 0 and GSM CGI; and
        v. use UMA LAI and UMA RAC to find LUPS;
    c. Else if GSM LAI is not available or GSM LAI is available but not in UNC_AUTHORIZED_LAI_LIST (and UmaOneCgiMccMncOption indicates option 1):
        i. randomly select NODEID (logical UNC), then find default UMA LAI for this logical UNC in UNC_AUTHORIZED_LAI_LIST, use UMA MCC and MNC from this default UMA LAI;
        ii. use CGI_OPTION_NUMBER 0, the NODEID number in previous step and UMA billing option to search UNC_ONE_CGI_UMA_LAC table, use the resulting UMA LAC;
        iii. search UNC_ONE_CGI_RAC_MAPPING table using this UMA LAI and GSM RAC (if available) and obtain UMA RAC;
        iv. use UMA LAI and UMA RAC to find LUPS;
        v. if SgsnAcceptSameCgiFromTwoNse is 1, use the default UMA CID 0x0000 for this LUPS (billing is taken care of by UMA LAC); and
        vi. if SgsnAcceptSameCgiFromTwoNse is 0, construct default UMA CID by putting LUPS number in 5 LSB (Least Significant Byte) of an empty CID (0x0000).

Example 2

In this example, UMA CGI construction uses fixed UMA LACs per logical UNC and uses UMA CID to encapsulate location information in GSM CGI as well as billing options. Specific aspects of algorithms providing for such UMA CGI construction include:
1. During UMA Registration time, UNC-CS acquires UMA billing option (from UMA DB procedures) and GSM CGI (if available); and
2. UNC-CS performs the following:
    a. If GSM LAI is available and is in UNC_AUTHORIZED_LAI_LIST (implies MCC/MNC option 1):

i. use GSM MCC/MNC as UMA MCC/MNC, record NODEID (logical UNC) for the entry;
ii. use CGI_OPTION_NUMBER 1, the NODEID number in previous step to search UNC_ONE_CGI_UMA_LAC table, use the resulting UMA LAC
iii. if sum of used bits in GsmCgiLacUsageMask (assume n), GsmCgiCidUsageMask (assume m) and Num_Billing_Bits (see Prepare Number of Billing Bits Needed, assume k)<=16 (don't need mapping table), construct UMA CID as follows: put the n meaningful bits of GSM LAC in n MSBs of UMA CID; put the m meaningful bits of GSM CID in next m MSBs of UMA CID; put billing option in k LSBs of UMA CID;
iv. else if sum of used bits in GsmCgiLacUsageMask, GsmCgiCidUsageMask and Num_Billing_Bits>16 (need mapping table), find UMA CID by looking up UNC_ONE_CGI_UMA_CID_MAPPING table using CGI_OPTION_NUMBER 1, GSM MCC/MNC, GSM LAC, GSM CID and billing option;
v. search UNC_ONE_CGI_RAC_MAPPING table using GSM LAI and GSM RAC (if available) and obtain UMA RAC; and
vi. use UMA LAI and UMA RAC to find LUPS;
b. Else if GSM LAI is available but not in UNC_AUTHORIZED_LAI_LIST (and UmaOneCgiMccMncOption indicates option 2), location information in GSM MCC/MNC needs to be preserved:
i. Randomly select NODEID (logical UNC), then find default UMA LAI for this logical UNC in AUTHORIZED_LAI_LIST, use UMA MCC and MNC from this default UMA LAI;
ii. use CGI_OPTION_NUMBER 1 and the NODEID number in previous step to search UNC_ONE_CGI_UMA_LAC table, use the resulting UMA LAC;
iii. search UNC_ONE_CGI_RAC_MAPPING table using this GSM LAI and GSM RAC (if available) and obtain UMA RAC;
iv. find UMA CID by looking up UNC_ONE_CGI_UMA_CID_MAPPING table using CGI_OPTION_NUMBER 1, GSM CGI and billing option;
v. use UMA LAI and UMA RAC to find LUPS
c. Else if GSM LAI is not available or GSM LAI is available but not in UNC_AUTHORIZED_LAI_LIST (and UmaOneCgiMccMncOption indicates option 1):
i. Randomly select NODEID (logical UNC), then find default UMA LAI for this logical UNC in UNC_AUTHORIZED_LAI_LIST, use UMA MCC and MNC from this default UMA LAI;
ii. use CGI_OPTION_NUMBER 1, the NODEID number in previous step to search UNC_ONE_CGI_UMA_LAC table, use the resulting UMA LAC;
iii. search ONE_CGI_RAC_MAPPING table using this UMA LAI and GSM RAC (if available) and obtain UMA RAC;
iv. use UMA LAI and UMA RAC to find LUPS;
v. if SgsnAcceptSameCgiFromTwoNse is 1, construct default UMA CID by putting billing option in Num_Billing_Bits LSB of an empty CID (0x0000), starting from the 6$^{th}$ LSB; and
vi. if SgsnAcceptSameCgiFromTwoNse is 0, construct default UMA CID by putting LUPS number in 5 LSB of an empty CID (0x0000), and billing option in next Num_Billing_Bits LSB of the CID.

Example 3

In this example, UMA CGI construction reuses GSM LAC as UMA LAC and uses UMA CID to encapsulate location information in GSM CID as well as billing options. Specific aspects of algorithms providing for such UMA CGI construction include:
1. During UMA Registration time, UNC-CS acquires UMA billing option (e.g., from UMA DB procedures) and GSM CGI (i.e., if available); and
2. UNC-CS performs the following:
   a. If GSM LAI is available and is in UNC_AUTHORIZED_LAI_LIST (implies MCC/MNC option 1):
   i. use GSM LAI as UMA LAI, record NODEID (logical UNC) for the entry;
   ii. if sum of used bits in GsmCgiCidUsageMask (assume m) and Num_Billing_Bits (Prepare number of billing bits needed, assume k)<=16 (don't need mapping table), construct UMA CID as follows (since UMA LAC is equal to GSM LAC, UMA CID could not collide with existing UMA CID): copy the m meaningful bits of GSM CID to UMA CID and put billing option in k vacant bits of UMA CID (start from LSB);
   iii. else if sum of used bits in GsmCgiCidUsageMask and Num_Billing_Bits>16 (need mapping table), find UMA CID by looking up UNC_ONE_CGI_UMA_CID_MAPPING table using CGI_OPTION_NUMBER 2, GSM MCC/MNC, GSM CID and billing option;
   iv. search UNC_ONE_CGI_RAC_MAPPING table using GSM LAI and GSM RAC (if available) and obtain UMA RAC; and
   v. use UMA LAI and UMA RAC to find LUPS;
   b. Else if GSM LAI is available but not in UNC_AUTHORIZED_LAI_LIST (and UmaOneCgiMccMncOption indicates option 2), location information in GSM MCC/MNC needs to be preserved;
   i. Randomly select NODEID (logical UNC), then find default UMA LAI for this logical UNC in UNC_AUTHORIZED_LAI_LIST, use this default UMA LAI;
   ii. search UNC_ONE_CGI_RAC_MAPPING table using the GSM LAI and GSM RAC (if available) and obtain UMA RAC;
   iii. find UMA CID by looking up UNC_ONE_CGI_UMA_CID_MAPPING table using CGI_OPTION_NUMBER 2, GSM CGI and billing option; and
   iv. use UMA LAI and UMA RAC to find LUPS;
   c. Else if GSM LAI is not available or If GSM LAI is available but not in UNC_AUTHORIZED_LAI_LIST (and UmaOneCgiMccMncOption indicates option 1);
   i. Randomly select NODEID (logical UNC), then find default UMA LAI for this logical UNC in UNC_AUTHORIZED_LAI_LIST, use this default UMA LAI;
   ii. search UNC_ONE_CGI_RAC_MAPPING table using this UMA LAI and GSM RAC (if available) and obtain UMA RAC;

iii. use UMA LAI and UMA RAC to find LUPS;
iv. if SgsnAcceptSameCgiFromTwoNse is 1, construct default UMA CID by putting billing option in Num_Billing_Bits LSB of an empty CID (0x0000), starting from the 6$^{th}$ LSB; and
v. if SgsnAcceptSameCgiFromTwoNse is 0, construct default UMA CID by putting LUPS number in 5 LSB of an empty CID (0x0000), and billing option in next Num_Billing_Bits LSB of the CID.

Referring now to instructions processible by a data processing device, it will be understood from the disclosures made herein that methods, processes and/or operations adapted for carrying out standalone UMA CGI functionality as disclosed herein are tangibly embodied by computer readable medium having instructions thereon that are configured for carrying out such functionality. In one specific embodiment, the instructions are tangibly embodied for carrying out the method 100 of FIG. 1 and/or the CGI modifying functionality of FIGS. 2-4 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., instructions) adapted for carrying out standalone UMA CGI functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for causing GSM location information and UMA billing information to be encapsulated in a single CGI structural element during a standalone UMA network access session, comprising:
   providing a GSM Edge Radio Access Network (GERAN) Cell Global Identity (CGI) structural element containing location information of a Mobile Station (MS) serving a subscriber device during a standalone UMA network access session;
   manipulating said MS location information for reducing an amount of MS location information holding space of the GERAN CGI structural element occupied by said MS location information such that a portion of said MS location information holding space becomes unused; and
   occupying at least a portion of said unused portion of said MS location information holding space with UMA billing information.

2. The method of claim 1 wherein manipulating said MS location information includes applying at least one network-specific algorithm to said MS location information.

3. The method of claim 2 wherein applying said at least one algorithm causes at least one of compressing, re-aligning and repackaging said MS location information.

4. The method of claim 1 wherein manipulating said MS location information includes at least one of compressing, re-aligning and repackaging said MS location information.

5. The method of claim 1 wherein said MS location information includes Location Area Identification (LAI) information and Cell Identity (CID) information.

6. The method of claim 1 wherein occupying said unused portion of said holding space with UMA billing information includes inserting said UMA billing information into at least a portion of said unused portion of said MS location information holding space.

7. The method of claim 6 wherein manipulating said MS location information includes applying at least one network-specific algorithm to said MS location information.

8. The method of claim 7 wherein said MS location information includes Location Area Identification (LAI) information and Cell Identity (CID) information.

9. The method of claim 8 wherein applying said at least one algorithm causes at least one of compressing, re-aligning and repackaging said MS location information.

10. A method for causing GSM location information and UMA billing information to be encapsulated in a single CGI structural element during a standalone UMA network access session, comprising:
    applying at least one algorithm to location information of a Mobile Station (MS) serving a subscriber device during a standalone UMA network access session for causing at least one of compressing, re-aligning and repackaging said MS location information whereby an amount of MS location information holding space of a GSM Edge Radio Access Network (GERAN) Cell Global Identity (CGI) structural element occupied by said MS location information is reduced such that a portion of said MS location information holding space becomes unused; and
    inserting UMA billing information into at least a portion of said unused portion of said MS location information holding space.

11. The method of claim 10, wherein said at least one algorithm is tailored to a customer specific network configuration corresponding to the MS serving the subscriber device during the standalone UMA network access session.

12. The method of claim 10 wherein said MS location information includes Location Area Identification (LAI) information and Cell Identity (CID) information.

13. The method of claim 12 wherein said at least one algorithm is tailored to a customer specific network configuration corresponding to the MS serving the subscriber device during the standalone UMA network access session.

14. A server or gateway capable of causing GSM location information and UMA billing information to be encapsulated in a single CGI structural element during a standalone UMA network access session, wherein the server or gateway is configured for:
    providing a GSM Edge Radio Access Network (GERAN) Cell Global Identity (CGI) structural element containing location information of a Mobile Station (MS) serving a subscriber device during a standalone UMA network access session;
    manipulating said MS location information for reducing an amount of MS location information holding space of the GERAN CGI structural element occupied by said MS location information such that a portion of said MS location information holding space becomes unused; and occupying at least a portion of said unused portion of said MS location information holding space with UMA billing information.

15. The server or gateway of claim 14 wherein manipulating said MS location information includes applying at least one network-specific algorithm to said MS location information.

16. The server or gateway of claim 15 wherein applying said at least one algorithm causes at least one of compressing, re-aligning and repackaging said MS location information.

17. The server or gateway of claim 14 wherein manipulating said MS location information includes at least one of compressing, re-aligning and repackaging said MS location information.

18. The server or gateway of claim 14 wherein said MS location information includes Location Area Identification (LAI) information and Cell Identity (CID) information.

19. The server or gateway of claim 14 wherein occupying said unused portion of said holding space with UMA billing information includes inserting said UMA billing information into at least a portion of said unused portion of said MS location information holding space.

20. The server or gateway of claim 19 wherein manipulating said MS location information includes applying at least one network-specific algorithm to said MS location information.

21. The server or gateway of claim 20 wherein said MS location information includes Location Area Identification (LAI) information and Cell Identity (CID) information.

22. The server or gateway of claim 21 wherein applying said at least one algorithm causes at least one of compressing, re-aligning and repackaging said MS location information.

* * * * *